US008849571B1

(12) United States Patent
Bonawitz et al.

(10) Patent No.: US 8,849,571 B1
(45) Date of Patent: Sep. 30, 2014

(54) METHODS AND SYSTEMS FOR DETERMINING FLEET TRAJECTORIES WITH PHASE-SKIPPING TO SATISFY A SEQUENCE OF COVERAGE REQUIREMENTS

(71) Applicant: Google Inc., Mountain View, CA (US)

(72) Inventors: Keith Allen Bonawitz, Berkeley, CA (US); Bradley James Rhodes, Alameda, CA (US)

(73) Assignee: Google Inc., Mountain View, CA (US)

( * ) Notice: Subject to any disclaimer, the term of this patent is extended or adjusted under 35 U.S.C. 154(b) by 14 days.

(21) Appl. No.: 13/726,697

(22) Filed: Dec. 26, 2012

(51) Int. Cl.
*G06Q 10/00* (2012.01)
*G06Q 10/04* (2012.01)
*H04B 7/185* (2006.01)
*G01C 21/00* (2006.01)

(52) U.S. Cl.
CPC .......... *G06Q 10/047* (2013.01); *H04B 7/18504* (2013.01); *G01C 21/00* (2013.01)
USPC ........................................................ 701/527

(58) Field of Classification Search
CPC .. B64G 1/1085; H04B 7/18504; G06Q 10/00; G06Q 10/003; G06Q 10/0043; G06Q 10/043; G06Q 10/047; G08G 5/003; G08G 5/0043; G08G 5/0069
USPC ................................................. 701/120, 527
See application file for complete search history.

(56) References Cited

U.S. PATENT DOCUMENTS

| | | | |
|---|---|---|---|
| 4,802,096 A * | 1/1989 | Hainsworth et al. | .......... 701/301 |
| 6,167,263 A | 12/2000 | Campbell | |
| 6,324,398 B1 | 11/2001 | Lanzerotti et al. | |
| 6,402,090 B1 | 6/2002 | Aaron | |
| 6,437,743 B1 | 8/2002 | Mintz et al. | |
| 6,507,739 B1 | 1/2003 | Gross et al. | |
| 6,611,755 B1 | 8/2003 | Coffee et al. | |
| 6,628,941 B2 | 9/2003 | Knoblach et al. | |

(Continued)

FOREIGN PATENT DOCUMENTS

FR          2972697          9/2012

OTHER PUBLICATIONS

"Fleet management with automatic vehicle location", by Harden, M.D., published May 20-22, 1986 (Motorola Inc., Mobile Products Division).

(Continued)

*Primary Examiner* — Helal A Algahaim
*Assistant Examiner* — Donald J Wallace
(74) *Attorney, Agent, or Firm* — McDonnell Boehnen Hulbert & Berghoff LLP

(57) ABSTRACT

Methods and systems for determining trajectories for a fleet of vehicles are provided. In one example, a method comprises receiving an initial location of one or more vehicles, and receiving a sequence of coverage requirements for a region and an associated period of time. The method also comprises determining, for each of one or more phases, single-phase landmarks that a vehicle could travel to over the duration of the phase, and determining for at least one of the one or more phases, phase-skipping landmarks that a vehicle could travel to over the duration of multiple phases. The method further comprises determining which landmarks of the single-phase landmarks and phase-skipping landmarks that a vehicle should travel to based on the initial locations of the one or more vehicles and the sequence of coverage requirements.

20 Claims, 9 Drawing Sheets

(56) References Cited

U.S. PATENT DOCUMENTS

| | | | |
|---|---|---|---|
| 6,678,520 B1 | 1/2004 | Wang | |
| 6,694,235 B2* | 2/2004 | Akiyama | 701/29.6 |
| 6,799,100 B2* | 9/2004 | Burns et al. | 701/25 |
| 6,842,674 B2* | 1/2005 | Solomon | 701/23 |
| 7,046,934 B2 | 5/2006 | Badesha et al. | |
| 7,356,390 B2 | 4/2008 | Knoblach et al. | |
| 7,469,857 B2 | 12/2008 | Voss | |
| 7,512,462 B2 | 3/2009 | Nichols et al. | |
| 7,844,218 B2 | 11/2010 | Seligsohn et al. | |
| 7,946,533 B2 | 5/2011 | Goodzeit | |
| 7,987,051 B2* | 7/2011 | Gnanasambandam et al. | 701/300 |
| 8,095,410 B2* | 1/2012 | Bloom | 705/7.22 |
| 8,116,763 B1 | 2/2012 | Olsen | |
| 8,170,747 B2* | 5/2012 | Chen et al. | 701/36 |
| 8,238,903 B2 | 8/2012 | Korb et al. | |
| 8,260,485 B1 | 9/2012 | Meuth et al. | |
| 8,275,499 B2 | 9/2012 | Coulmeau et al. | |
| 8,494,689 B1* | 7/2013 | Ashton | 701/3 |
| 2002/0019760 A1* | 2/2002 | Murakami et al. | 705/8 |
| 2002/0077944 A1 | 6/2002 | Bly et al. | |
| 2003/0040273 A1 | 2/2003 | Seligsohn et al. | |
| 2003/0141409 A1* | 7/2003 | Lisoski et al. | 244/13 |
| 2006/0167599 A1 | 7/2006 | Boden et al. | |
| 2007/0250211 A1* | 10/2007 | Berlin et al. | 700/244 |
| 2007/0288132 A1 | 12/2007 | Lam | |
| 2008/0144884 A1 | 6/2008 | Habibi | |
| 2008/0312820 A1* | 12/2008 | Kapoor | 701/202 |
| 2009/0099768 A1* | 4/2009 | Bauer et al. | 701/206 |
| 2009/0267740 A1 | 10/2009 | Pizzuto | |
| 2011/0106417 A1* | 5/2011 | Christ et al. | 701/200 |
| 2011/0147513 A1 | 6/2011 | Surmont | |
| 2012/0073682 A1 | 3/2012 | Geneste | |
| 2012/0215505 A1 | 8/2012 | Srivastav | |
| 2012/0256770 A1 | 10/2012 | Mitchell | |
| 2012/0310691 A1* | 12/2012 | Carlsson et al. | 705/7.13 |

OTHER PUBLICATIONS

"A Mobile Location—Based Vehicle Fleet Management Service Application", by Silva, A.P., published Jun. 9-11, 2003, IEEE.

A method for Balloon Trajectory Control, by Aaron, K.M. et al., Global Aerospace Corporation, published Jun. 21, 2008.

Path Planning for Autonomous Underwater Vehicles in Realistic Oceanic Current Fields: Application to Gliders in the Western Mediterranean Sea, by Garau B. et al., Journal of Maritime Research, vol. VI. No. II, pp. 5-22, 2009.

Real-time Trajectory Design for Unmanned Aerial Vehicles using Receding Horizon Control, by Yoshiaki Kuwata, Thesis submitted to the MIT Department of Aeronautics and Astronautics, Jun. 2003.

Swarm Intelligence in autonomous collective robotics: from tools to the analysis and synthesis of distributed control strategies, Alcherio Martinoli, Thesis, 1999.

Autonomous Underwater Vehicle Path Planning: A Comparison of A* and Fast Marching Method, Kevin DeMarco, available at http://www.kevindemarco.com/wp-content/uploads/2011/05/fmm_paper_revised.pdf, 2011.

Optimal AUV path planning for extended missions in complex, fast-flowing estuarine environments, Dov Kruger et al., 2007 IEEE Conference on Robotics and Automation, Apr. 2007.

* cited by examiner

TIME: T = N

TIME: T = N-1

METHODS AND SYSTEMS FOR DETERMINING FLEET TRAJECTORIES WITH PHASE-SKIPPING TO SATISFY A SEQUENCE OF COVERAGE REQUIREMENTS

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one example, a method is provided that comprises receiving an initial location of one or more vehicles of a fleet of vehicles, and receiving a sequence of coverage requirements for a region and an associated period of time. The region may be divided into a plurality of landmarks and the period of time may be divided into a plurality of phases. An individual coverage requirement is indicative of a desired number of vehicles for one or more of the plurality of landmarks at an end of a given phase. The method also comprises determining, by a processor, for each of one or more phases and at least one respective landmark of the plurality of landmarks, single-phase landmarks of the plurality of landmarks that can be reached by a vehicle starting from the respective landmark and following a single-phase path. The method further comprises determining, by the processor, for at least one respective phase of the one or more phases, phase-skipping landmarks of the plurality of landmarks that can be reached by a vehicle starting from a landmark of a set of landmarks associated with the respective phase and following a phase-skipping path. According to the method, based on the sequence of coverage requirements and the initial locations of the one or more vehicles, the processor determines which landmarks of the single-phase landmarks and phase-skipping landmarks for a vehicle to travel to during the one or more phases. A single phase path includes a path that a given vehicle can travel for a duration of a single phase, while a phase-skipping path includes a path that a given vehicle can travel for a duration of two or more phases.

In another example, a computer-readable storage medium having stored therein instructions, that when executed by a computing device, cause the computing device to perform functions is provided. The functions comprise receiving an initial location of one or more vehicles of a fleet of vehicles, and receiving a sequence of coverage requirements for a region and an associated period of time. The region may be divided into a plurality of landmarks and the period of time may be divided into a plurality of phases. An individual coverage requirement is indicative of a desired number of vehicles for one or more of the plurality of landmarks at an end of a given phase. The functions also comprise determining, for each of one or more phases and at least one respective landmark of the plurality of landmarks, single-phase landmarks of the plurality of landmarks that can be reached by a vehicle starting from the respective landmark and following a single-phase path. The functions further comprise determining, for at least one respective phase of the one or more phases, phase-skipping landmarks of the plurality of landmarks that can be reached by a vehicle starting from a landmark of a set of landmarks associated with the respective phase and following a phase-skipping path. The functions also comprise determining which landmarks of the single-phase landmarks and phase-skipping landmarks for a vehicle to travel to during the one or more phases based on the sequence of coverage requirements and the initial locations of the one or more vehicles. A single phase path includes a path that a given vehicle can travel for a duration of a single phase, while a phase-skipping path includes a path that a given vehicle can travel for a duration of two or more phases.

In still another example, a system is provided that comprises at least one processor, and data storage comprising program instructions executable by the at least one processor to cause the system to perform functions. The functions comprise receiving an initial location of one or more vehicles of a fleet of vehicles, and receiving a sequence of coverage requirements for a region and an associated period of time. The region may be divided into a plurality of landmarks and the period of time may be divided into a plurality of phases. An individual coverage requirement is indicative of a desired number of vehicles for one or more of the plurality of landmarks at an end of a given phase. The functions also comprise determining, for each of one or more phases and at least one respective landmark of the plurality of landmarks, single-phase landmarks of the plurality of landmarks that can be reached by a vehicle starting from the respective landmark and following a single-phase path. The functions further comprise determining, for at least one respective phase of the one or more phases, phase-skipping landmarks of the plurality of landmarks that can be reached by a vehicle starting from a landmark of a set of landmarks associated with the respective phase and following a phase-skipping path. The functions also comprise determining which landmarks of the single-phase landmarks and phase-skipping landmarks for the vehicle to travel to during the one or more phases based on the sequence of coverage requirements and the initial locations of the one or more vehicles. A single phase path includes a path that a given vehicle can travel for a duration of a single phase, while a phase-skipping path includes a path that a given vehicle can travel for a duration of two or more phases.

These as well as other aspects, advantages, and alternatives, will become apparent to those of ordinary skill in the art by reading the following detailed description, with reference where appropriate to the accompanying figures.

DETAILED DESCRIPTION

Figure 1:
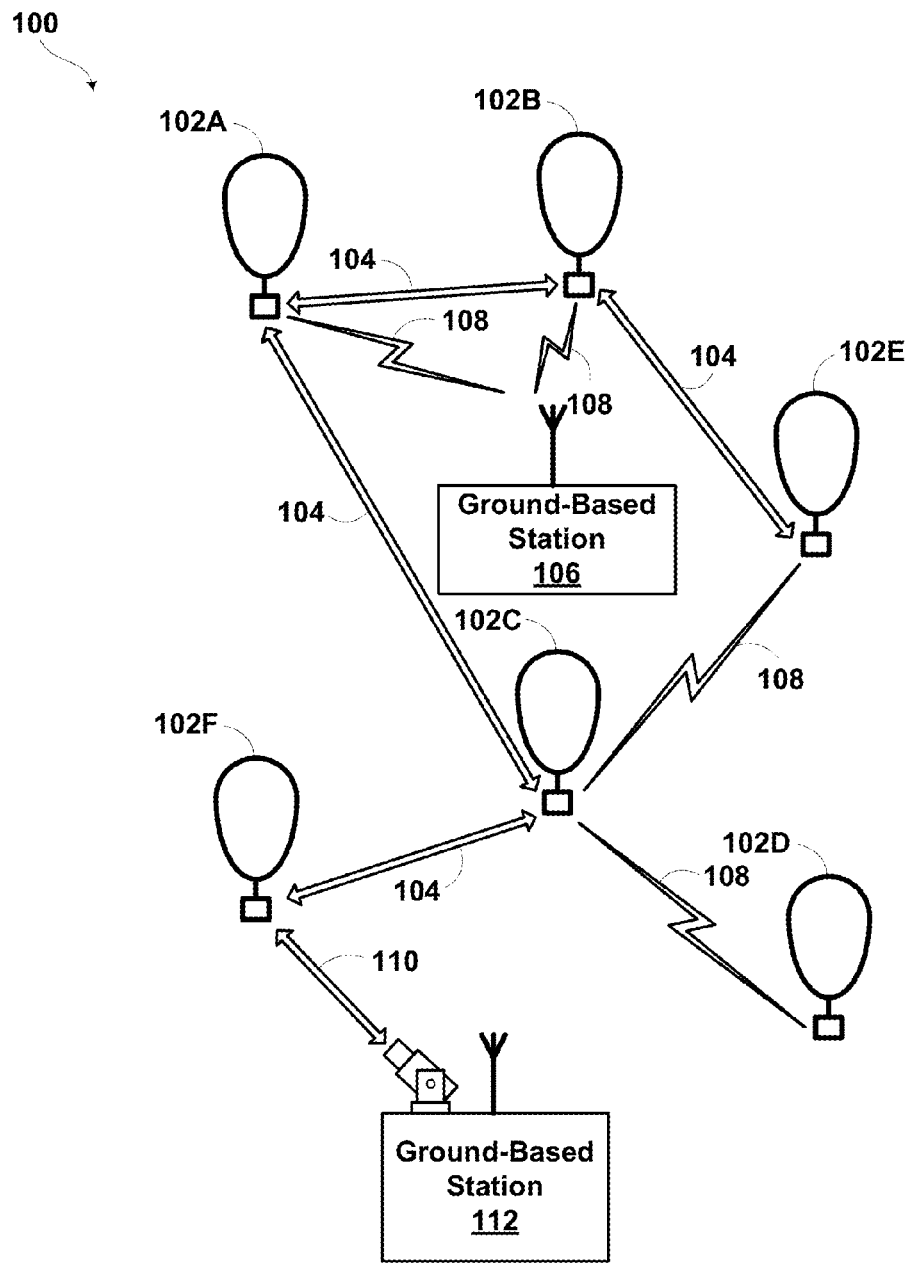
FIG. 1 is a block diagram illustrating an example balloon network.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Examples herein may be configured to provide control of vehicles within a fleet of vehicles. The vehicles may be any number of types of vehicles including, for example, autonomous or semi-autonomous vehicles, such as aerial vehicles, boats, underwater vehicles, satellites, aerostats, etc. for mapping/surveying, sensing, providing connectivity, etc. In other examples, methods described herein may be used to control or dispatch autonomous cars to maintain a well-distributed fleet of autonomous taxis in a city to support rapid dispatch of taxis. The vehicles may be any type of mobile object, element, platform, etc.

In still further examples, vehicles may be or include elements of a data network that includes a plurality of balloons, for example, configured as a mesh network formed by high-altitude balloons deployed in the stratosphere. Since winds in the stratosphere may affect locations of the balloons in a differential manner, each balloon in an example network may be configured to change its horizontal position by adjusting its vertical position (i.e., altitude). For example, by adjusting its altitude, a balloon may be able find winds that will carry the balloon horizontally (e.g., latitudinally and/or longitudinally) to a desired horizontal location. In other examples, each balloon may be configured to change its horizontal position using propellers or other mechanisms to generate horizontal thrust rather than or in addition to adjusting its horizontal position by adjusting its vertical position.

Within examples, methods and systems are described with respect to elements of a fleet of vehicles being balloons in a fleet of balloons arranged as a data network. However, as mentioned above, methods and systems herein may be applicable to other types of vehicles of a fleet of vehicles, and thus, the examples described are not limiting.

When managing a fleet of autonomous balloons, a fleet administrator or computer may determine a sequence of coverage requirements for the fleet. The sequence of coverage requirements may specify desired amounts of balloon coverage for different parts of the world. For instance, the desired amounts of balloon coverage may include providing at least ten balloons in a first area, at least five balloons in a second area, and at least eighteen balloons in a third area at a first instance in time and then, at a second instance in time, providing at least five balloons in the first area, ten balloons in the second area, and twenty balloons in the third area. In one example, in order for a fleet of balloons to satisfy the coverage requirements, a fleet plan that stages balloons in particular places ahead of deadlines such that the balloons will be able to arrive at a desired location on time may be required. Therefore, to control the fleet of balloons, a simultaneous plan of trajectory for many balloons at many different starting locations is needed, and each balloon may take a different path.

Given the initial position of one or more balloons of a fleet of balloons and a sequence of coverage requirements, systems and methods for determining trajectories for each balloon of the fleet that satisfy the sequence of requirements are provided. According to an example method, initial positions of each balloon of a fleet of balloons as well as a sequence of coverage requirements may be received or determined. The coverage requirements may be goal distributions for the fleet that are defined with respect to various landmarks of a region of interest. For example, the region of interest may include a small region of the Earth or possibly the entire Earth, and the landmarks may be individual locations or subregions within the region of interest. The coverage requirements may specify a desired number of balloons, or goal, for each landmark at various times within a planning period of time.

The period of time may then be divided into a plurality of phases. For instance, each phase may correspond to a time interval within the period of time. Within each phase, a summary of which landmarks are reachable by a balloon from which other landmarks may be determined based on predicted wind conditions for the region of interest. For example, for each phase and each respective landmark, single-phase landmarks may be found. Single-phase landmarks may be other landmarks of the region that can be reached by a balloon that is starting from the respective landmark at the beginning of the phase and following one or more estimated winds at one or more altitudes along a single-phase path for a duration of the phase. Additionally, for one or more of the phases, phase-skipping paths that lead to phase-skipping landmarks may be found. A phase-skipping path, for example, may be a path that a balloon may follow by beginning at a starting landmark at the beginning of a phase and following one or more estimated winds at one or more altitudes for a duration of two or more phases.

In some instances, a phase-skipping path may not align with any landmarks during an intermediate phase. That is to say, a balloon need not travel to a distinct landmark (or waypoint) during a phase that is "skipped" en route to a phase-skipping landmark. In some cases, there may be a path that is achievable by a balloon over multiple phases that would otherwise not be achievable simply by concatenating multiple single-phase paths over an equivalent number of phases.

Given the summary of which landmarks are reachable from other landmarks during each phase as well as the goal number of balloons for each landmark at the end of each phase, a determination regarding which landmark that each balloon should travel to during each phase may be made. A determination may be made whether a balloon at a given landmark should follow a single-phase path to a single-phase landmark or follow a phase-skipping path to a phase-skipping landmark. Additionally a determination of which specific landmark of the reachable single-phase landmarks and/or phase-skipping landmarks that the given balloon should travel to may be made.

In some instances, trajectories for each balloon that satisfy the sequence of coverage requirements may be determined by solving an optimization problem. In one example, trajectories that minimize the number of unsatisfied goals may be found by minimizing a linear objective function. In another example, the trajectories may be sequentially determined for each phase. Other optimization methods that directly or approximately solve for the trajectories of the fleet may also be used, and the examples are not meant to be limiting. Thus, in some examples, based on the initial positions of a fleet of balloons and a sequence of coverage requirements, trajectories for the fleet that maximize a likelihood of satisfying the sequence of coverage requirements may be determined.

Referring now to the Figures, FIG. 1 is a block diagram illustrating an example balloon network 100. As shown, the balloon network 100 includes balloons 102A to 102F, which are configured to communicate with one another via free-space optical links 104 and/or RF links 108. Configured as such, balloons 102A to 102F may collectively function as a mesh network for packet-data communications. Further, at least some of balloons 102A and 102B may be configured for RF communications with ground-based stations 106 via respective RF links 108. Yet further, some balloons, such as balloon 102F, may be configured to communicate via optical link 110 with ground-based station 112.

In an exemplary embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has a wide range of wind speeds. For instance, between 17 km and 20 km altitude above the surface, the average wind speed may be between about 30 mph to about 35 mph, while the max wind speed may be up to 200 mph. As another example, at about 26 km altitude above the surface, the average wind speed may be between about 60 mph to about 65 mph, while the max wind speed may exceed 300 mph.

More specifically, in a high-altitude-balloon network, balloons 102A to 102F may generally be configured to operate at altitudes between 18 km and 25 km (although other altitudes are possible). At such altitudes, the winds may vary with latitude and by season, and the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an exemplary embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers.

In a further aspect, balloons 102A to 102F may utilize one or more of various different RF air-interface protocols for communication with ground-based stations 106 via respective RF links 108. For instance, some or all of balloons 102A to 102F may be configured to communicate with ground-based station 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect in balloon network 100, balloon 102F is configured as a downlink balloon to provide a high-capacity air-ground link. Like other balloons in an exemplary network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and ground-based station 112.

Note that in some implementations, a downlink balloon 102F may additionally be operable for RF communication with ground-based station 106. In other cases, a downlink balloon 102F may only use an optical link for balloon-to-ground communications. Further, while the arrangement shown in FIG. 1 includes just one downlink balloon 102F, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104.

Ground-based stations, such as ground-based station 106 and/or 112, may include components such as transceivers, transmitters, and/or receivers for communication via RF links and/or optical links with a balloon network. Further, a ground-based station may use various air-interface protocols in order to communicate with a balloon 102A to 102F over an RF link. As such, a ground-based station 106 may be configured as an access point via which various devices can connect to balloon network 100.

In a further aspect, some or all balloons 102A to 102F could be configured to establish a communication link with space-based satellites in addition to, or as an alternative to, a ground-based communication link. In some embodiments, a balloon may communicate with a satellite via an optical link.

Further, some ground-based stations, such as ground-based station 106, may be configured as gateways between balloon network 100 and one or more other networks. Such a ground-based station 106 may thus serve as an interface between the balloon network and the Internet, a cellular service provider's network, and/or other types of networks.

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to the balloon and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an exemplary balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. For instance, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, the same wavelength can be assigned for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

In some examples, a balloon network 100 may have a non-uniform topology. For instance, exemplary embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be more dense over land than over large bodies of water. Many other examples of non-uniform topologies are possible.

Figure 2:
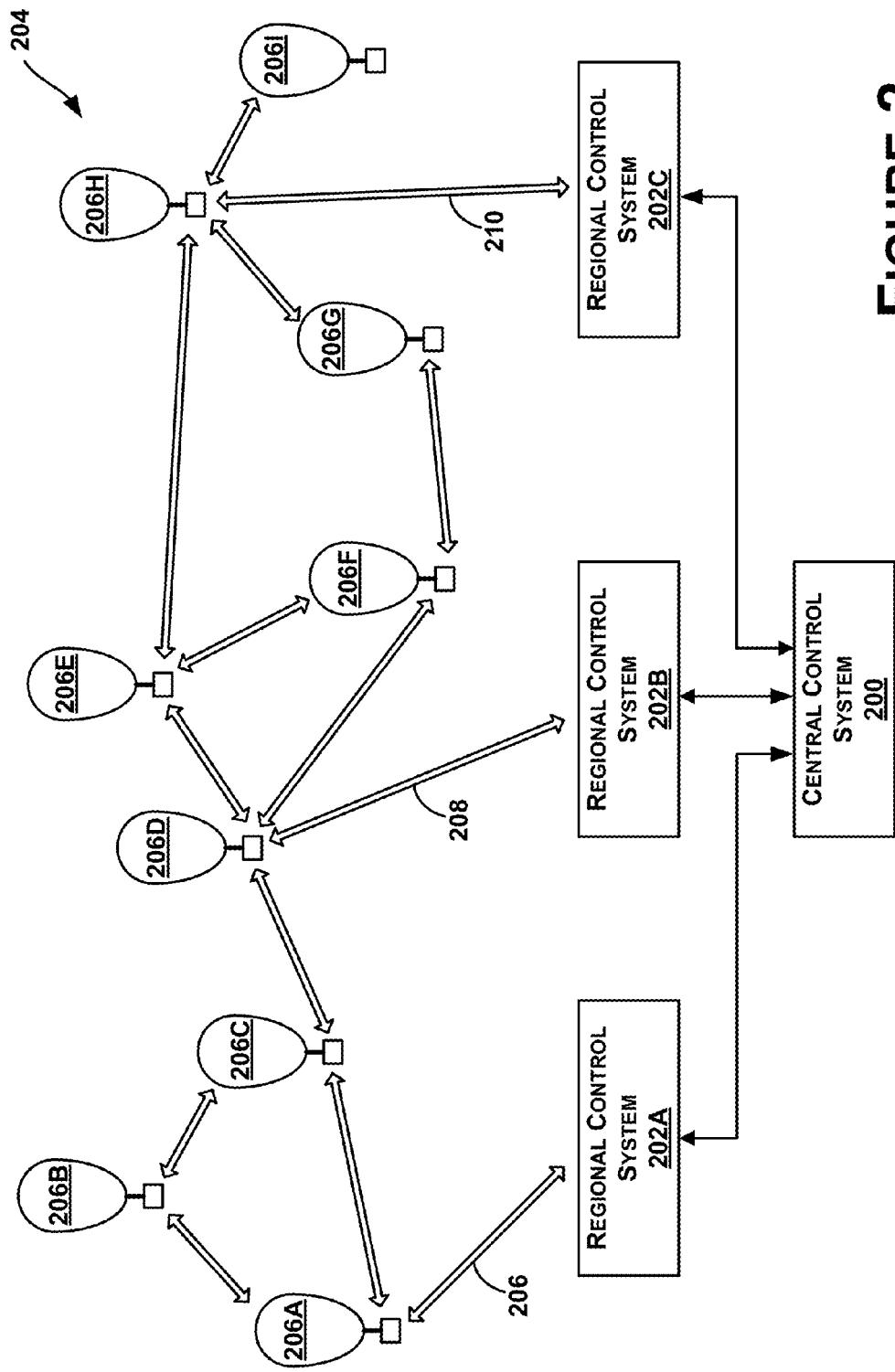
FIG. 2 is a block diagram illustrating an example balloon-network control system.

FIG. 2 is a block diagram illustrating an example balloon-network control system. In particular, FIG. 2 shows a distributed control system, which includes a central control system 200 and a number of regional control-systems 202A to 202C. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that the balloons cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 204A, 204D, and 204H are configured as downlink balloons. As such, regional control systems 202A to 202C may respectively communicate with balloons 204A, 204D, and 204H via optical links 206, 208, and 210, respectively.

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in the balloon network and/or the wavelength availability on the links. This topology may then be sent to some or all of the balloons so that a routing technique may be employed to select appropriate lightpaths (and possibly backup lightpaths) for communications through the balloon network 204.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Figure 3:
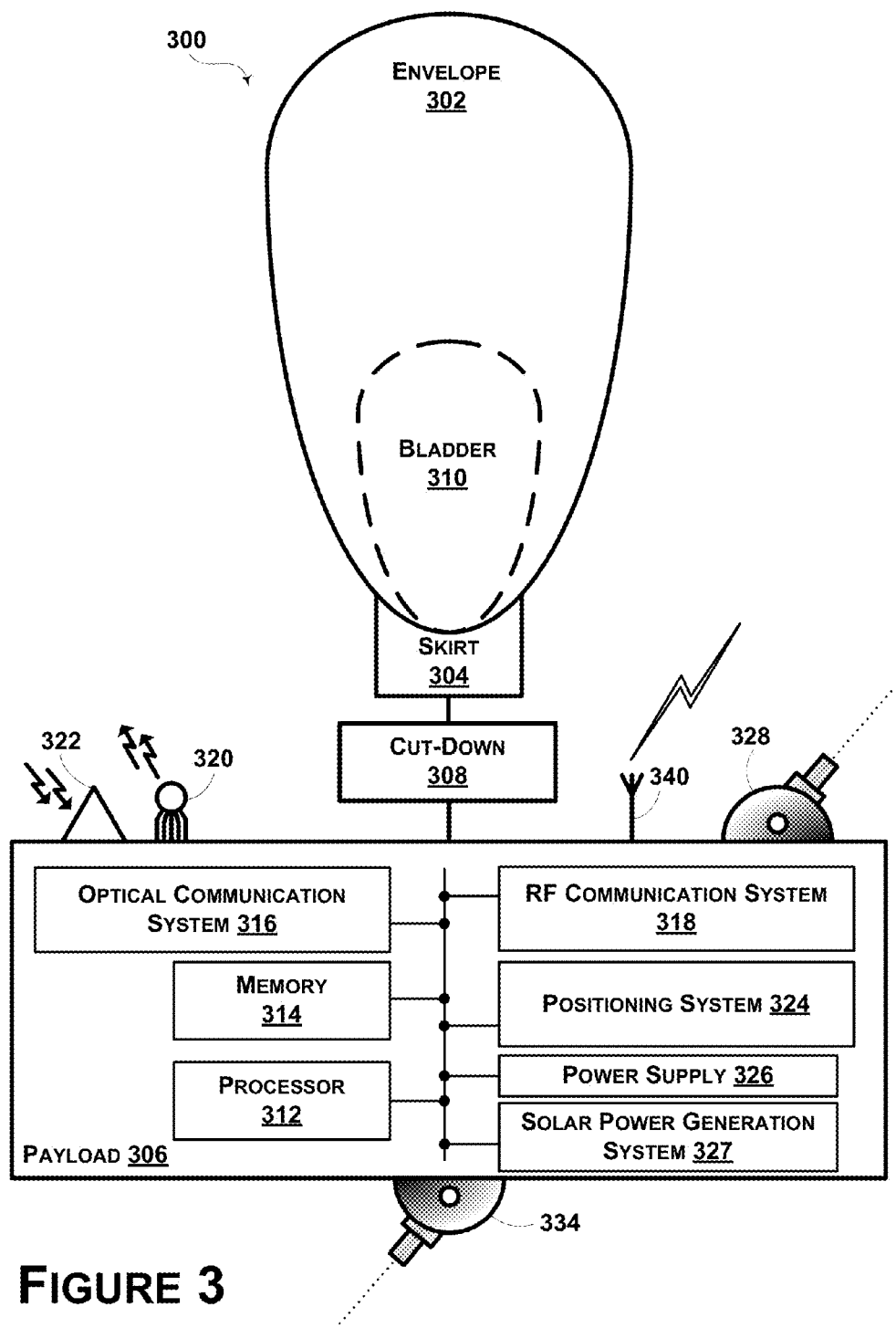
FIG. 3 shows a high-altitude balloon according to an example embodiment.

Various types of balloon systems may be incorporated in an exemplary balloon network. As noted above, an exemplary embodiment may utilize high-altitude balloons, which typically operate in an altitude range between 18 km and 25 km. FIG. 3 shows a high-altitude balloon 300, according to an exemplary embodiment. As shown, the balloon 300 includes an envelope 302, a skirt 304, a payload 306, and a cut-down system 308 that is attached between the balloon 302 and payload 306.

The envelope 302 and skirt 304 may take various forms, for instance, the envelope 302 and/or skirt 304 may be made of metalized Mylar or BoPet. Alternatively or additionally, some or all of the envelope 302 and/or skirt 304 may be constructed from a highly-flexible latex material or a rubber material such as chloroprene. Further, the shape and size of the envelope 302 and skirt 304 may vary depending upon the particular implementation. Additionally, the envelope 302 may be filled with various different types of gases, such as helium and/or hydrogen.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photo-diode receiver system). Further, payload 306 may include an RF communication system 318, which may transmit and/or receive RF communications via an antenna system 340. The payload may further include a positioning system 324 that can include a GPS or other location-based sensors.

The payload 306 may also include a power supply 326 to supply power to the various components of balloon 300. The power supply 326 may include or take the form of a rechargeable battery. In addition, the balloon 300 may include a solar power generation system 327. The solar power generation system 327 may include solar panels and could be used to generate power that charges and/or is distributed by the power supply 326.

Further, payload 306 may include various types of other systems 328 and sensors 334. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force.

In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, the balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an exemplary embodiment, the cut-down system 308 may include a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302. Other types of cut-down systems and/or variations on the illustrated cut-down system 308 are possible as well.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground. In yet other embodiments, balloons may be serviced in-flight by specific service balloons or another type of service aerostat or service aircraft.

As described, movement and locations of balloons can vary since winds in the stratosphere may affect the locations of the balloons in a differential manner. A balloon in an example network may be configured to change its horizontal position by adjusting its vertical position (i.e., altitude). For example, by adjusting its altitude, a balloon may be able to find winds that will carry the balloon horizontally (e.g., latitudinally and/or longitudinally) to a desired horizontal location. Wind speed and/or direction may vary with altitude, and since current wind velocities as well as weather forecasts are available, in principle, a balloon may be directed to a location by identifying an altitude at which a wind direction takes a balloon to along a desired trajectory. However, a balloon without other forms of propulsion may be constrained to follow the wind and there may not be a single altitude with winds taking the balloon along the desired trajectory. In addition, to control a fleet of balloons, movement of the balloons should occur from one location above the surface of the Earth to another in a predictable manner.

In some examples, determining a fleetplan for a fleet of balloons may require staging balloons of the fleet into places ahead of time such that the balloons will be able to arrive at a landmark on time. For instance, a balloon may need to follow a trajectory that does not contribute usefully to goals during a first phase and a second phase such that the balloon can reach a desired landmark at the end of a third phase. This kind of staging may be useful when, goal landmarks are spread non-uniformly throughout a fleet's coverage area. For example, there may be large regions (e.g., relative to a balloon's maximum range during a phase) requiring few or no balloons, but which may need to be traversed in order to satisfy a goal number of balloons for other regions. Such situations arise naturally, for example, when goal distributions are proportional to population density: there are a limited number of people in the oceans, few people on many parts of land, and many people in major cities.

In one case, a system may be configured to receive (or determine) a starting location of each balloon of a fleet of balloons and receive a sequence of coverage requirements for the region for a planning time period. As an example, the sequence of coverage requirements for the time period may specify a goal number of balloons for each of a plurality of landmarks within the region at various times T during the time period. The system may also be configured to divide the time period into phases based on distinct values of T in the sequence of coverage requirements: a first phase may be defined from a starting time of the time period to an earliest T; a second phase may be defined between the end of the first phase and a second earliest T, etc. Additionally, a set of landmarks may be associated with the start and end of each phase: the start of the first phase may use the initial location of each of the balloons as landmarks; the end of the first phase and the start of the second phase may share the set of landmarks associated with the earliest T, etc.

Based on the received information, the system may be further configured to determine trajectories that satisfy the sequence of coverage requirements for the region. To determine the trajectories, the system may establish possible routes for balloons within each phase. For each landmark at the start of a phase and for each landmark at the end of the phase, the system may determine how close to the end-ofphase landmark that a balloon starting from the start-of-phase landmark could get by traveling during the phase. A landmark that can be reached from a respective landmark by starting at the respective landmark and following one or more estimated winds during a single-phase may be identified as a single-phase landmark that is reachable from the respective landmark.

Figure 4:
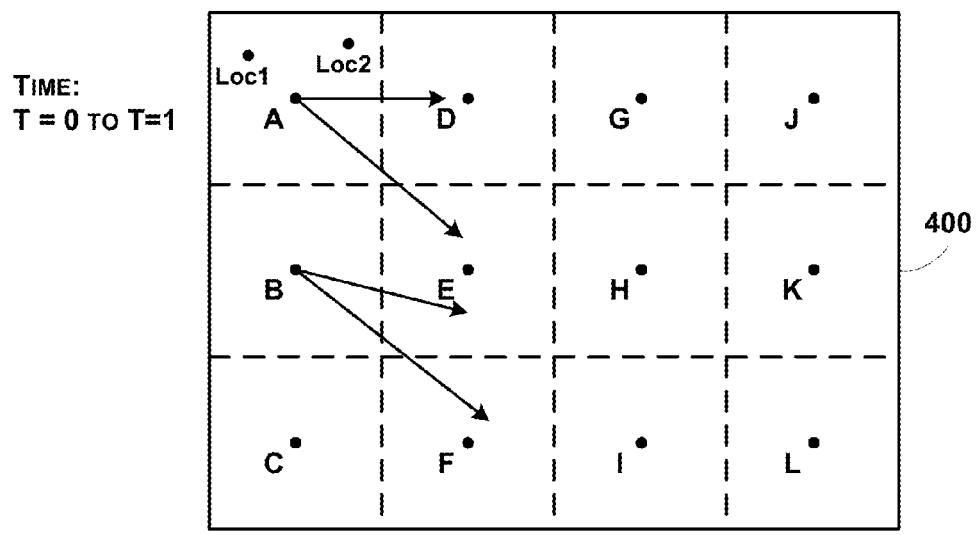
FIG. 4 illustrates example single-phase paths for a balloon that is traveling from a landmark A and a balloon that is traveling from a landmark B.

FIG. 4 illustrates example single-phase paths for a balloon that is traveling from a landmark A and a balloon that is traveling from a landmark B. As shown in FIG. 4, a region 400 has been divided into a plurality of subregions, and the landmarks A-L have been established at the center of each subregion. Note that in some examples coverage requirements may specify a goal number of balloons to be located at one or more locations within the region 400, and the goal number of balloons may be added to the nearest landmark to determine the goal number of balloons for each landmark. For example, if an individual coverage requirement indicates that five balloons are desired at location Loc1 and seven balloons are desired at location Loc2, the desired number of balloons for landmark A may be determined to be twelve.

Although the landmarks A-L are distributed uniformly throughout the region 400, the example is not meant to be limiting. In other instances, landmarks may be non-uniformly distributed within the region 400. For example, if a region covers the entire Earth, one or more oceans or countries may not include any landmarks.

The example single-phase paths may be determined based on estimated or predicted wind conditions at one or more altitudes. In the example of FIG. 4, the wind conditions are assumed to generally include winds flowing from left-to-right with additional variation in the vertical direction from time T=0 to T=1. For landmark A, single-phase paths that a balloon starting at landmark A could follow to reach landmarks D and E are shown. For landmark B, single-phase paths that a balloon starting at landmark B could follow to reach landmarks E and F are shown.

In some instances, to determine trajectories that satisfy a sequence of coverage requirements, the system may also establish possible routes for balloons that allow balloons to "skip" phases. For example, a balloon may begin a path at a landmark at the beginning of a phase, not arrive at any landmark at the end of one or more intermediate phases, and then finally arrive at a landmark at the end of a subsequent phase. That is, the path of the balloon may allow the balloon to "skip" traveling to and from specific landmarks during intermediate phases and arrive at a landmark after the duration of two or more phases. A landmark that can be reached from a respective landmark by starting at the respective landmark and following one or more estimated winds over the course of multiple phases may be identified as a phase-skipping landmark that is reachable from the respective landmark.

Figure 5:
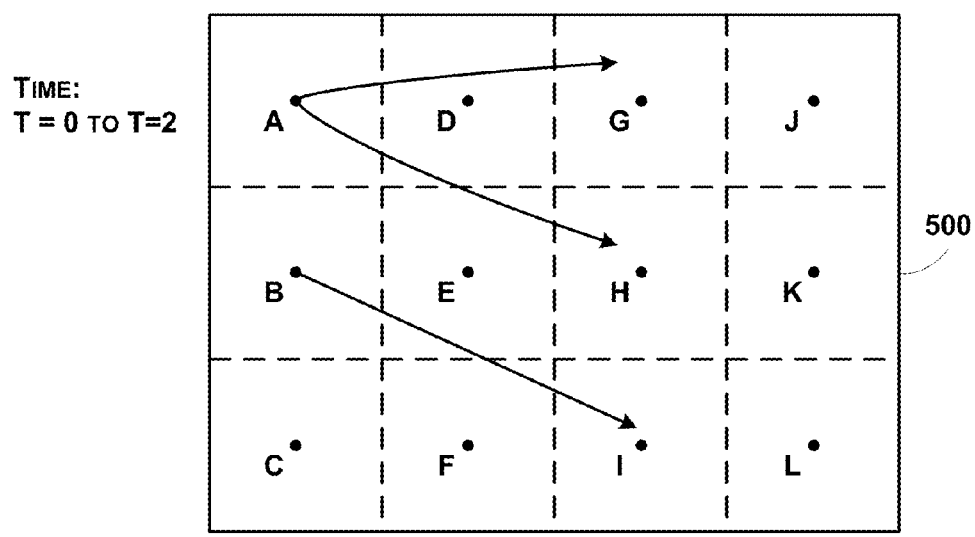
FIG. 5 illustrates example phase-skipping paths for a balloon that is traveling from a landmark A and a balloon that is traveling from a landmark B.

FIG. 5 illustrates example phase-skipping paths for a balloon that is traveling from a landmark A and a balloon that is traveling from a landmark B. As in the example of FIG. 4, the example phase-skipping paths may be determined based on estimated or predicted wind conditions at one or more altitudes. In the example of FIG. 5, the wind conditions are assumed to generally include winds flowing from left-to-right with additional variation in the vertical direction from time T=0 to T=2. For landmark A, phase-skipping paths that a balloon starting at landmark A could follow to reach landmarks G and H are shown. For landmark B, a phase-skipping path that a balloon starting at landmark B could follow to reach landmark I is shown.

In some cases, there may be a path that is achievable by a balloon over multiple phases that would otherwise not be achievable simply by combining multiple single-phase paths over an equivalent number of phases. For example, due to wind conditions in the region 500, it may be possible for a balloon starting at landmark A to travel to landmark E during a single phase from T=0 to T=1, while it may not be possible for a balloon to travel from landmark E to landmark H from T=1 to T=2. However, it may still be possible for a balloon to travel from landmark A to landmark H from T=0 to T=2. For instance, a balloon traveling on the two single-phase paths from A to E and E to H may be able to get within 50 km of landmark H while a balloon traveling on the phase-skipping path from A to H may be able to get within 5 km of landmark H.

In one example, a backward planner may be used to determine a measure of how close to a target location that a balloon could reach if the balloon was starting at another location within a region. For example, given a target time and target location as well as an initial time, the backward planner may be configured to determine, for a grid of starting locations within a region, a measure of how close to the target location a balloon could get, if the balloon was flying from initial time to target time.

Figure 6:
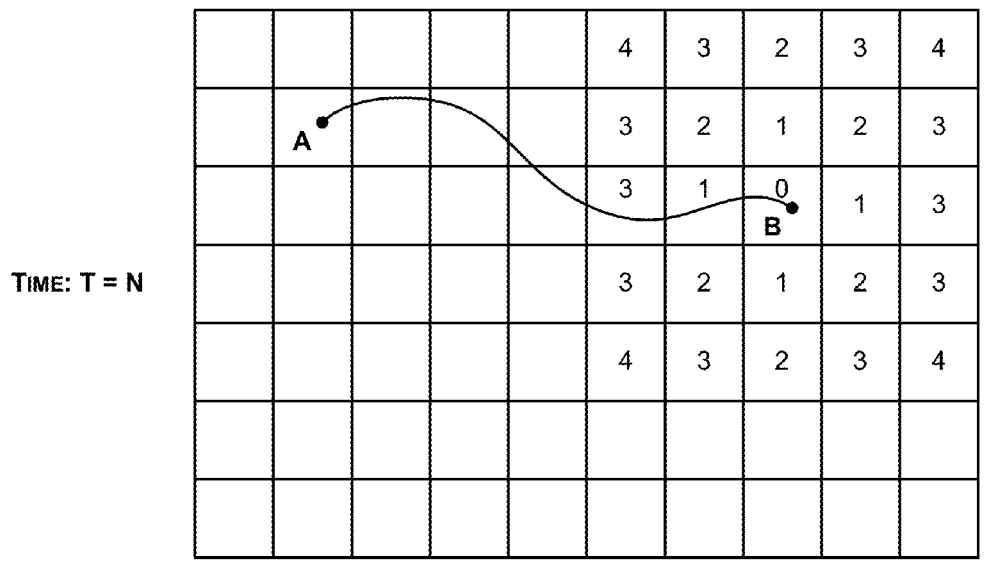
FIG. 6 illustrates an example cost value map where location A is a starting location of a balloon, location B is a desired final location, and example cost values are assigned to cells surrounding location B.

The backward planner may consider a problem of minimizing a cost function associated with a balloon path. As an example, the cost function may be a measure of how close a balloon gets to a target location by following a path. FIG. 6 illustrates an example cost value map where location A is a starting location of a balloon, location B is a desired final location, and example cost values are assigned to cells surrounding location B. For a time period from T=0 to T=N, the time period can be discretized in order to consider a situation of the balloon at times T=0, 1, 2, ..., N. The region can also be discretized by dividing the region into a finite number of cells. For instance, FIG. 6 illustrates a region that has been divided into a number of cells (e.g., a 10×7 grid of cells). Although the region is represented as a rectangular grid, the example is not meant to be limiting.

At time T=N (e.g., a final time of a planning phase), there is no planning to do since the balloon will be at a final location at this time, and a cost value can be assigned to each cell based on a final location of the balloon. For time T=N, cost values may be systematically assigned such that a cell in which the desired location resides has a low cost and cells further away may be assigned a higher cost value (e.g., the farther away from the desired location, the higher the cost value). Thus, as shown, a cell in which the desired location B resides can be assigned a cost value of zero, and cost values for surrounding cells can be assigned higher cost values based on a distance away from the desired location cell. Cost values for all cells can be populated in this manner by increasing the cost value for a given cell based on the distance from the desired location.

Following, cost value maps of all cells may be generated for each time step T=0, 1, 2, ..., N−1. To construct the cost value maps, a map may be generated for time T=N−1, and maps for previous times may be generated working backwards, such as next generating a map for time T=N−2, followed by T=N−3, and so on.

Figure 7:
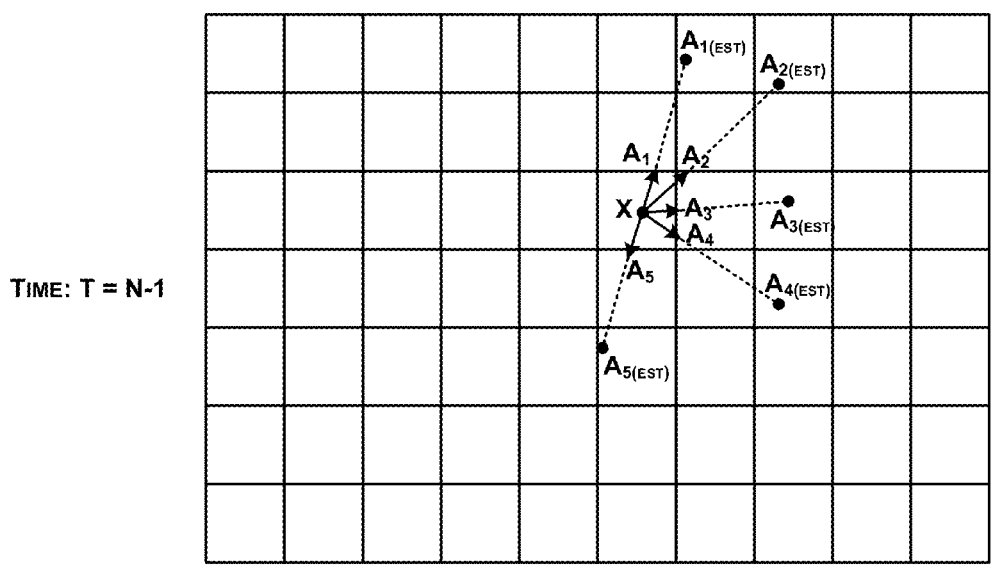
FIG. 7 illustrates an area divided into cells, and for a given cell labeled X, example wind vectors $A_1$-$A_5$ that are determined based on wind conditions at five different altitude levels.

After generating the map at time T=N, to generate a map for a next previous time step, possible altitudes and corresponding possible locations that can be reached over the time interval from T=N−1 to T=N for a balloon present in every cell at time T=N−1 can be estimated. For each cell and for one or more altitudes, an estimation of where the balloon will arrive by starting at that cell and flying at that altitude during the time interval can be determined. For example, weather predictions at time T=N−1 may indicate that, for a given cell, different wind conditions exist for different altitudes. FIG. 7 illustrates an area divided into cells (e.g., a 10 by 7 grid of cells), and for a given cell labeled X, example wind vectors $A_1$-$A_5$ that are determined based on wind conditions at five different altitude levels.

In some examples, wind vectors associated with different altitudes may be the same for each cell. In other examples, wind vectors associated with different altitudes may vary based on the location of the cell. For each cell, an estimation of where a balloon would travel to (e.g., destination cell) at the end of the time period if the balloon started at the cell and moved with a given wind vector is determined. To do so, a direction and magnitude (e.g., speed) of the estimated wind vector can be used to estimate a trajectory and distance that the balloon travels, and to determine estimated destination cells (e.g., $A_{1(EST)}$-$A_{5(EST)}$). FIG. 7 illustrates estimated destination cells for a balloon starting at cell X, and moving with one of the five wind vectors $A_1$-$A_5$. Example simulations can be performed to simulate movement of the balloons due to the estimated wind directions and speed, for example.

In some examples, further estimations may be made by a balloon traveling at a first altitude for a portion of a time interval and then changing to a second altitude for a remainder of the time interval. It could be possible that by traveling at any given number of combinations of altitudes, the winds may be able to carry the balloon to a desired location over the time interval.

As shown in the example in FIG. 7, wind vector $A_3$ results in the balloon reaching a closest proximity to the desired final location B at time T=N. Cost values for the balloon traveling along the wind vectors $A_1$-$A_5$ may be determined based on the stored cost values at T=N for the destination cells $A_{1(EST)}$-$A_{5(EST)}$. For example, the wind vector $A_3$ may be assigned a value of zero, and cost values for a remainder of the wind vectors may be assigned higher cost values for causing the balloon to travel to a location further away from the desired destination (e.g., such as a $A_4$ having cost of one, $A_5$ having cost of four, $A_2$ having cost of two, and $A_1$ having cost of three).

An altitude that results in a smallest cost value can be determined, and the altitude and cost value can be stored for the cell X for time T=N−1. Thus, in the example described, for cell X at time T=N−1, a balloon in cell X that has a desired destination location B at time T=N can be instructed to travel at altitude $A_3$. The same determinations may be performed for each cell of the area.

The process above may be repeated to determine cost value maps for time interval T=N−2 based on predicted wind conditions for T=N−2 to T=N−1 and the stored cost values for T=N−1. Further, the process may be repeated for time intervals T=N−3, T=N−4, and so on until T=0. In some examples, each cell of a given map has estimates of directions that are based on estimates of directions as determined for a subsequent time interval. This enables planning for a balloon to take a given path at a first time interval so that the balloon will be at a location needed during the next time interval to take appropriate action, and so on.

Referring back to the examples illustrated by FIGS. 4 and 5 the backward planner may be able to determine, for starting landmark A, a minimum distance from each of landmarks A-L that a balloon could reach if the balloon was flying from T=0 to T=1, and a minimum distance from each of landmarks A-L that the balloon could reach if the balloon was flying from T=0 to T=2. For example, a cost value for each of landmarks A-L may be proportional to a distance such that a given cost value can be converted to a given three-dimensional distance. The backward planner may also be able to determine, for landmark A, which altitude a balloon should fly at T=0 in order to get as close as possible to a given landmark by T=1. Similarly, the backward planner may be able to determine for each of the other landmarks B-L, a minimum distance from each of the landmarks that a balloon could reach if the balloon was flying from T=0 to T=1 and if the balloon was flying from T=0 to T=2.

The backward planner is provided as one example mechanism for establishing possible single-phase paths and phase-skipping paths between landmarks during one or more phases. However, other mechanisms that can determine, for a particular staring location/time and an ending location/time, how close to the ending location a balloon can reach in the time period allotted, based on predicted wind velocities at one or more altitudes may also be utilized.

Figure 8A:
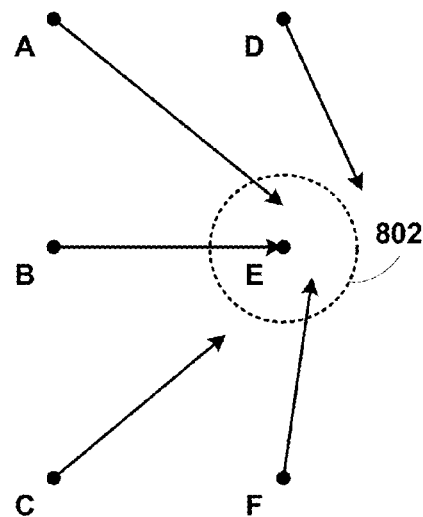
FIGS. 8A and 8B illustrate examples of determining landmarks from which a balloon could reach a landmark E.
Figure 8B:
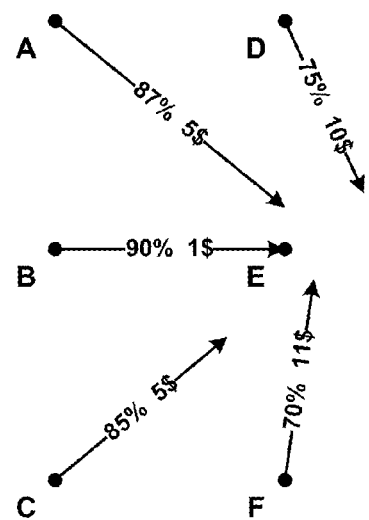

In some examples, filtering heuristics may also be applied to further refine the possible routes between landmarks during a phase(s). FIGS. 8A-8B illustrate examples of determining a set of starting landmarks from which a balloon could reach a landmark E.

In one example, thresholding may be used to impose a notion of how close to a target landmark that a balloon needs to be able to get in order to be considered to be capable of reaching the landmark. For example, a set of paths may be selected as feasible routes based on a comparison between the minimum distances associated with paths from landmarks A-D and F and a threshold distance. Based on the trajectories shown in FIG. 8A, balloons traveling from landmarks A, B, and F could get within a threshold distance 802 of the landmark E. Therefore, the paths from landmarks A, B, and F may be retained as possible paths that a balloon could follow to reach landmark E, while the landmarks D and C may be ignored.

In another example, a set of paths may be selected as feasible routes based on a confidence of reaching a target landmark from a starting landmark and/or a cost value associated with flying to the target landmark from a starting landmark. As shown in FIG. 8B, each path from starting landmarks A-D and F includes an associated probability, as indicated by a percentage on a scale of 1 to 100. The probability may be determined based on the variability of one or more wind conditions (e.g., wind direction and/or speed). In one example, based on the associated probabilities, the paths from landmarks A, B and C may be selected as a set of possible paths that a balloon could follow to reach landmark E because their associated probabilities are greater than a confidence threshold (e.g., 85%).

Additionally, as shown in FIG. 8B, each path from starting landmarks A-D and F includes an associated cost, as indicated by a dollar amount. In one example, the cost may be associated with a cost in power that is necessary to adjust the altitude of a balloon to reach one or more altitudes during the path. Accordingly, a set of paths may be selected as feasible routes based on a comparison between the cost values associated with each starting landmark and a cost threshold. For instance, the path starting at landmark B may be selected as the only possible route because the path associated with landmark B has the only cost that is below 3$.

In still another example, a set of possible paths that a balloon could follow to reach a landmark may be selected from among the possible paths to reach the landmark by retaining the top N number of paths from respective landmarks (e.g., sorted to prefer minimum distances from within the target landmark that a balloon could get). It is contemplated that one or any combination of the described filtering heuristics may be used to determine a set possible routes to and/or from a landmark and another landmark.

Figure 9:
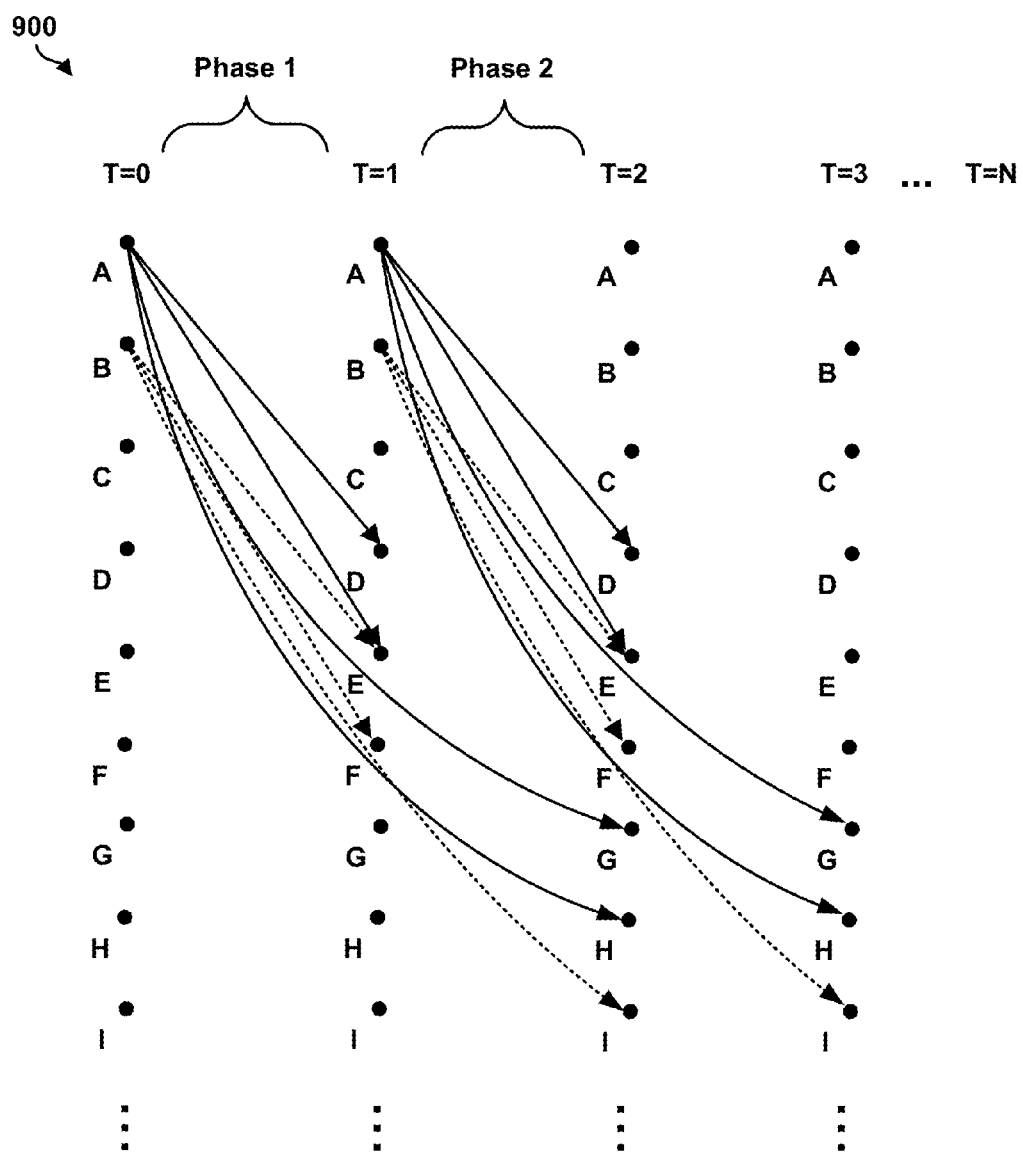
FIG. 9 illustrates an example graph of possible routes between a plurality of landmarks in accordance with an example embodiment.

FIG. 9 illustrates an example graph 900 of possible routes between a plurality of landmarks in accordance with an example embodiment. Continuing with the examples from FIGS. 4 and 5, landmarks A-I are represented. Each straight edge between two landmarks represents a single-phase path a balloon could follow to get from a landmark at the beginning of a phase to a landmark at the end of the phase. For instance, a balloon at landmark A at time T=0 may be able to reach landmark D or E by time T=1. Further, each curved edge between two landmarks represents a phase-skipping path that a balloon could follow to get from a landmark at the beginning of a first phase to another landmark at the end of a second phase. For instance, a balloon at landmark B at time T=1 may be able to reach landmark I by T=3.

For purposes of explanation, only possible routes for balloons that are starting at landmark A (solid lines) and landmark B (dotted lines) are shown in FIG. 9. Note that although the edges of phase 1 are the same as the edges for phase 2 in FIG. 9, in other examples, edges may vary among phases. Also, in other examples, the system may determine phase-skipping paths over the course of more than two phases. For instance, for a predetermined range of k the system may determine phase-skipping landmarks that can be reached by a balloon starting from each landmark A-L and following a phase-skipping path for a duration of k phases, where k is an integer that is greater than 1. In some examples, the system may determine phase-skipping landmarks for each phase and each landmark of the plurality of landmarks. In other examples, the system may determine phase-skipping landmarks for a subset of phases and/or a subset of starting landmarks.

Once the graph 900 is constructed, an optimization method may be used to choose how many balloons flow across each connection in the graph (i.e., from each starting landmark to each ending landmark) during each phase. The optimization method may be configured to obey one or more consistency constraints. For example, a number of balloons leaving a landmark in phase P may be set to be the same as the number of balloons that arrived at that landmark at the end of phase P−1. The consistency constraint may take into account balloons leaving or arriving via single-phase paths as well as via phase-skipping paths. As another example, a number of balloons at any landmark or traveling along any edge cannot be negative.

If the sequence of coverage requirements is treated as strict requirements, the problem of determining trajectories for the fleet may be considered a constraint satisfaction problem, where optimization means solving the constraint graph subject to the constraint that each goal is satisfied. If it is allowable to sometimes leave some goals unsatisfied, the problem may be considered an optimization problem: find the configuration that, for example, minimizes the number of unsatisfied goals, or some other measure of the goals' dissatisfaction.

Such a problem can be solved using a variety of methods, including as a linear program, as a minimum-cost-flow problem, via gradient descent, via stochastic optimization, or using other existing or future developed methods.

For instance, the problem may be solved as a linear program. In one case, the goal for the linear program is to take a time-varying description of how many balloons are desired at each landmark ("the goal distribution"), the initial location of each balloon, and a summary of which goal landmarks are reachable from which other landmarks at a given time, along with a measure of how accurately a balloon can be expected to reach a goal landmark, and determine a fleet-wide policy that maximizes a likelihood of satisfying the goal distribution. Note that the goal distribution is not concerned with determining where any particular balloon goes, but rather that the correct numbers of balloons are in the correct areas at each phase.

To solve the problem as a linear program, constants, variables, and constraints may be defined.

The constants may include:
startingAtOrigin[origin]=the initial distribution; the number of balloons at each location at the beginning of a planning period
requiredAtGoal[phase, goal]=the goal distribution; how many balloons desired at each goal at the end of each phase
score1[phase, origin, goal]=accuracy estimate for the path from origin to goal during phase.
score2[phase, origin, goal, phase−1]=accuracy estimate for the path from origin to goal during phase−1 to phase.

The variables may include:
A1[phase, origin, goal]=how many vehicles move from origin to goal during phase; defined only if it is possible to reach the goal from the origin given the wind at that phase.
A2[phase, origin, goal, phase−1]=how many vehicles move from origin to goal from the start of phase−1 to the end of phase; defined only if it is possible to reach the goal from the origin given the wind during phase−1 and phase.
atGoal[phase, goal]=the number of balloons at goal at the end of phase
deficit[phase, goal]=the number of balloons by which the goal distribution was under-satisfied at goal at the of phase, that is: max(0, requiredAtGoal−atGoal).

The constraints may include:
Non-negative flow
∀origin, ∀goal, ∀phase: 0≤A1[phase, origin, goal]
∀origin, ∀goal, ∀phase>0: 0≤A2[phase, origin, goal, phase−1]
Conservation on the origin side
∀origin: $\Sigma_{goal}$A1[0, origin, goal]+$\Sigma_{goal}$A2[1, origin, goal, 0]=startingAtOrigin [origin]
∀origin, ∀phase>0: $\Sigma_{goal}$A1[phase, origin, goal]+$\Sigma_{goal}$A2[phase+1, origin, goal, phase]=atGoal[phase−1, origin]
Conservation on the goal side
∀goal: atGoal[0, goal]=$\Sigma_{origin}$A1[0, origin, goal]
∀goal, ∀phase>0: atGoal[phase, goal]=$\Sigma_{origin}$A1[phase, origin, goal]+$\Sigma_{origin}$A2[phase, origin, goal, phase−1]
Non-negative deficits
∀goal, ∀phase: 0≤deficit[phase, goal]
∀goal, ∀phase: requiredAtGoal[phase, goal]≤atGoal[phase, goal]+deficit[phase, goal]

Based on the constants, variables, and constraints defined above, a linear program solver may be used to minimize the example objective function shown below:

$\alpha \cdot c_{error}(\Sigma_{phase}\Sigma_{goal}$deficit[phase, goal])+(1−α)($\Sigma_{phase}\Sigma_{origin}\Sigma_{goal}$score1[phase, origin, goal]A1[phase, origin, goal]+$\Sigma_{phase}\Sigma_{origin}\Sigma_{goal}$score2[phase, origin, goal, phase−1]A2[phase, origin, goal, phase−1])

The objective function penalizes fleet plans that put less than the minimum number of balloons at some landmark; for each balloon fewer than desired, the penalty goes up. The optimal plan, therefore, is the plan that minimizes the objective function. An additional term can also be included that minimizes a measure of how close to a target landmark that each balloon can get. For instance, the additional term seeks to minimize the sum of the score constants for each path traversed. The additional term causes the linear program solver to prefer accurate trajectories and penalize trajectories that do not reliably deliver the balloon directly to a goal landmark.

In the example objective function, $c_{error}$ is a weight parameter and a may be another parameter that is used to adjust the relative importance of minimizing the number of missed goals versus preferring accurate trajectories. For instance, increasing $\alpha \cdot c_{error}$, may cause the linear program solver to prefer fleet trajectories that satisfy a goal distribution better, at the cost of being willing to use less accurate flight paths. Also, increasing $(1-\alpha)$ may cause the linear program solver to prefer fleet plans that use accurate/reliable flight paths, at the cost of being willing to leave more of a goal distribution unsatisfied.

Note that the example above allows for phase-skipping paths that occur over a duration of two phases. In other examples, the linear program solver may be modified to consider longer phase-skipping paths.

In further examples, the score constants may be a measure of a confidence associated with whether a balloon traveling from origin could reach goal during phase or multiple phases. For instance, the measure of confidence may be a probability that is determined based on the variability of one or more wind conditions (e.g., wind direction and/or speed). In addition, the configuration of the linear program could further be modified such that the number of balloons atGoal is an expected number of balloons that is determined based on the probabilities of each balloon reaching the goal landmark. For example, if a balloon has a 75% chance of reaching a goal landmark, the balloons contribution to atGoal may be 0.75 balloons instead of 1 balloon.

In another variant, the score constants may be replaced or augmented with a measure of cost associated with a path from origin to goal during phase or phases. For instance, the cost may be a cost-in-dollars, cost-in-power, or other cost measure. The linear program solver may then be configured to minimize total cost in the determined trajectories.

Figure 10:
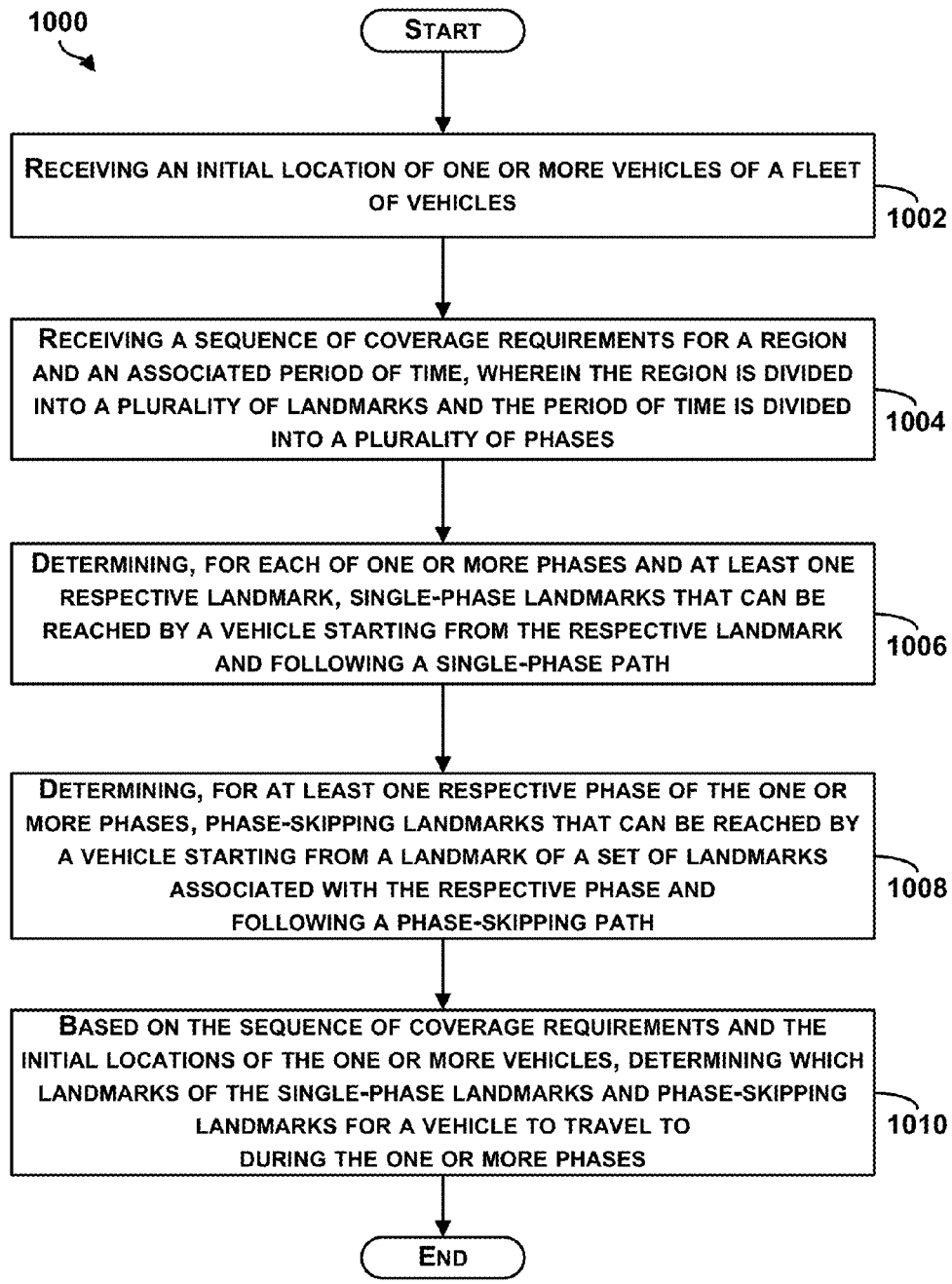
FIG. 10 is an example block diagram of a method to determine trajectories for a fleet of vehicles, in accordance with at least some embodiments described herein.

FIG. 10 is an example block diagram of a method 1000 to determine trajectories for a fleet of vehicles, in accordance with at least some embodiments described herein. Method 1000 shown in FIG. 10 presents an embodiment of a method that could be used with the balloon networks 100 and 204, for example, and may be performed by a device, a server, a control station, a balloon, or a combination of any components of the balloon networks 100 and 204. Method 1000 may include one or more operations, functions, or actions as illustrated by one or more of blocks 1002-1010. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 1000 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 1000 and other processes and methods disclosed herein, each block in FIG. 10 may represent circuitry that is wired to perform the specific logical functions in the process.

At block 1002, the method 1000 includes receiving an initial location of one or more vehicles of a fleet of vehicles. In one example, each vehicle may include a GPS or other location-based sensor. Based on information received from the location-based sensor a location of each vehicle may be determined. For instance, each vehicle may periodically send its location to a central control system or other node. Note that in some examples the location of each vehicle of the fleet of vehicles may be received. In other examples, the location of every vehicle of the fleet of vehicles may not be received.

At block 1004, the method 1000 includes receiving a sequence of coverage requirements for a region and an associated period of time. The region may be divided into a plurality of landmarks and the period of time may be divided into a plurality of phases. An individual coverage requirement may then specify a desired number of vehicles for one or more of the plurality of landmarks at an end of a given phase. Note that the number of vehicles may be a minimum number of vehicles that is desired for each of the plurality of landmarks, and in some instances, it may be acceptable to have more than the minimum number of vehicles at each landmark. Additionally, in some instances, the minimum number of vehicles may be zero for one or more landmarks and/or one or more phases. In one example, each coverage requirement may be specified in the form of a goal distribution. For instance, the goal distribution may be determined based on population densities for different parts of the region or short-term coverage demands for one or more locations within the range. In some examples, an individual coverage requirement may specify a desired number of vehicles (e.g., zero vehicles, four vehicles, etc.) for each respective landmark of the plurality of landmarks.

At block 1006, the method 1000 includes, determining, for each of one or more phases and at least one respective landmark, single-phase landmarks that can be reached by a vehicle starting from the respective landmark and following a single-phase path. In an example in which vehicles of the fleet of vehicles include a balloon within a data network that is operable to provide data communication via optical or RF links, a backward planner may be used to determine, for each respective landmark and each phase, a minimum distance from each other landmark that a balloon could get, if the balloon was following one or more predicted winds during the phase. If a minimum distance associated with a particular landmark is less than a threshold distance, a determination may be made that the balloon could reach the particular landmark, and the particular landmark may be identified as a single-phase landmark. In one example, the one or more predicted winds may be determined based on wind data received from one or more balloons of the fleet. In other examples, the wind data may be determined based on wind data received from the National Oceanic and Atmospheric Administration (NOAA).

At block 1008, the method 1000 includes determining, for at least one respective phase of the one or more phases, phase-skipping landmarks that can be reached by a vehicle starting from a landmark of a set of landmarks associated with the respective phase and following a phase-skipping path. In the example in which vehicles of the fleet of vehicles include a balloon within a data network, a backward planner may be used to determine, for each respective landmark of a set of landmarks associated with a given phase, a minimum distance from each other landmark that a balloon could get, if the balloon was following one or more predicted winds during k phases, for one or more predetermined integer values of k>1. If a minimum distance associated with a particular landmark is less than a threshold distance, a determination may be made that the balloon could reach the particular landmark, and the particular landmark may be identified as a phase-skipping landmark.

In one instance, phase-skipping paths may be determined for a predetermined range of k values for each possible starting landmark and ending landmark pair of the plurality of landmarks. Alternatively, phase-skipping paths may be strategically determined for particular combinations of values of k and sets of starting landmark and ending landmark pairs that are likely to be valuable. For example, if a previous determination of fleet trajectories indicated that a certain set of goals are difficult to satisfy during one or more phases, phase-skipping paths may be evaluated for the one or more phases.

At block 1010, the method 1000 includes, based the sequence of coverage requirements and the initial locations of the one or more vehicles, determining which landmarks of the single-phase landmarks and phase-skipping landmarks for a vehicle to travel to during the one or more phases. For instance, a linear objective function may be minimized to determine which respective landmark that each vehicle should travel to.

In some examples, the method 1000 may further include providing an instruction to the vehicle to travel to the determined respective landmark during the one or more phases. Thus, a set of instructions can be provided that indicates a travel plan for the vehicle. In an example in which vehicles of the fleet of vehicles include a balloon within a data network, the travel plan may indicate specific altitudes to fly at for various locations within the region. In other examples, an instruction can be sent to the balloon to indicate to change an altitude, and the instruction may be sent when the altitude change is needed.

In some examples, the method 1000 or portions of the method 1000 may be performed by a ground-based station (e.g., the ground-based station 102 in FIG. 1) or a central system (e.g., the central control system 200 in FIG. 2), and instructions can be provided to individual vehicles. In other examples, the method 1000 or portions of the method 1000 may be perform by the vehicles themselves, or by processors or computing devices residing on the vehicle, for example. The vehicles may receive any necessary information for performing the method 1000 from a server or ground-base station or from other vehicles. In further examples, the method 1000 may be performed by a combination of the vehicles and by ground-based stations, and each may be in communication so as to perform functions of the method 1000.

In some instances, it may be desirable to re-execute a planning process frequently as new information arrives about exact locations of vehicles, a health of a vehicles, changes in the environment or region to be navigated, etc. In such situations, the method 1000 may be subsequently re-executed to determine revised trajectories. For instance, a previous solution may be used as an initial guess for the subsequent process, the and the subsequent process may revise the initial guess to determine a new solution.

Figure 11:
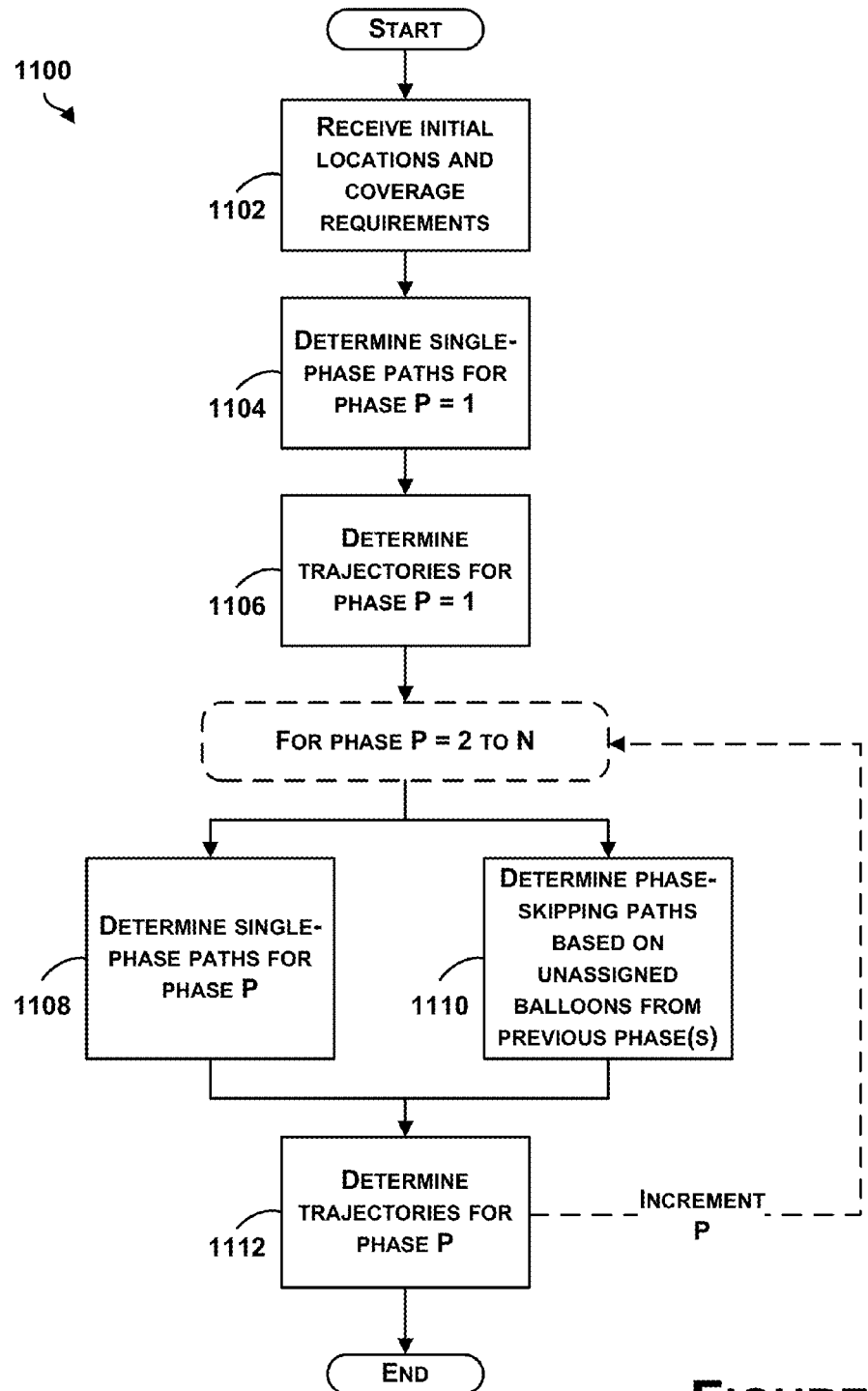
FIG. 11 illustrates an example method to determine trajectories for a fleet of balloons, in accordance with at least some embodiments described herein.

In some examples, other approximate strategies may be used to determine trajectories based on single-phase paths and phase-skipping paths. FIG. 11 illustrates an example method 1100 to determine trajectories for a fleet of balloons, in accordance with at least some embodiments described herein. As shown in FIG. 11, at block 1102, initial locations of each balloon of a fleet of balloons and coverage requirements for a region and an associated period of time may be received. For example, the period of time may be divided into a plurality of phases from 1 to N.

At block 1104, single-phase paths may be determined for a first phase 1. For instance, the single-phase paths may be paths that balloons could travel from their initial locations to a landmark of the region by the end of phase 1. Based on the sequence of coverage requirements and the determined single-phase paths for phase 1, at block 1106, trajectories for each balloon of the fleet of balloons may be determined. In one example, the trajectories may be determined using a linear program solver. A solution to the linear program solver may indicate how many balloons should travel each single-phase path. For instance, the solution may indicate which landmark of a plurality of landmarks that each balloon should travel to during phase 1 to satisfy a goal distribution at the end of phase 1.

After the first phase has been processed, trajectories for phases 2 through N may be sequentially determined. For phase 2, at block 1108, single-phase paths within phase 2 may be determined. For example, possible paths between landmarks during phase 2 may be determined. If there are more balloons in the fleet than there are goals at the end of phase 1, then some balloons will be left over. That is, there may be some balloons that are not required to travel to a specific landmark during phase 1 to satisfy the goal distribution for the end of phase 1. Accordingly, at block 1110, phase-skipping paths may be determined based on the unassigned balloons from phase 1. When phase 2 is processed at block 1112, its end-of-phase goals can be satisfied using either the balloons from the end-of-phase 1 landmarks (that have followed a single-phase path during phase 1) or the left over balloons that were unassigned during phase 1.

Similarly, for phase 3, trajectories can be determined to satisfy an end-of-phase goal distribution using balloons that traveled single-phase paths during phase 2, or balloons that were unassigned in either phase 2 or unassigned in both phase 1 and phase 2.

Such a heuristic structure also enables the phase-skipping paths to be generated on-demand instead of ahead of time. The ahead of time strategy requires evaluating approximately $K*L^2$ start-landmark/end-landmark pairs per phase, where K is the maximum number of phases to skip and L is number of landmarks. The on-demand strategy, in contrast, requires evaluating approximately $L*G$ start-landmark/end-landmark pairs, where G is the number of goal landmarks per phase. This is because only G end-landmarks need to be considered and the total number of unassigned balloons in all previous phases plus the number of available balloons at the start of a given phase does not exceed the total number of balloons. Thus, generating phase-skipping paths on-demand may be more efficient than generating phase-skipping paths ahead-of-time.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving an initial location of one or more vehicles of a fleet of vehicles;
receiving a sequence of coverage requirements for a region and an associated period of time, wherein the region is divided into a plurality of landmarks and the period of time is divided into a plurality of phases, and wherein an individual coverage requirement is indicative of a desired number of vehicles of the fleet of vehicles for one or more of the plurality of landmarks at an end of a given phase;
determining, by a processor, for each of one or more phases and at least one respective landmark of the plurality of landmarks, single-phase landmarks of the plurality of landmarks that can be reached by a vehicle of the fleet of vehicles starting from the respective landmark and following a single-phase path, wherein a single-phase path includes a path that the vehicle can travel for a duration of a single phase;
determining, by the processor, for at least one respective phase of the one or more phases, phase-skipping landmarks of the plurality of landmarks that can be reached by the vehicle starting from a landmark of a set of landmarks associated with the respective phase and following a phase-skipping path, wherein a phase-skipping path includes a path that the vehicle can travel for a duration of two or more phases; and
based on the sequence of coverage requirements and the initial locations of the one or more vehicles, determining, by the processor, which landmarks of the single-phase landmarks and phase-skipping landmarks for the vehicle to travel to during the one or more phases.

2. The method of claim 1, further comprising instructing the vehicle to travel to the determined landmarks during the one or more phases.

3. The method of claim 1, wherein the vehicle includes a balloon within a data network that is operable to provide data communication via optical or radio-frequency (RF) links.

4. The method of claim 3:
wherein a single-phase path includes a path that the balloon can travel by following one or more estimated winds at one or more altitudes for a duration of a single phase; and
wherein a phase-skipping path includes a path that the balloon can travel by following one or more estimated winds at one or more altitudes for a duration of two or more phases.

5. The method of claim 1, further comprising:
sequentially determining which landmarks of the single-phase landmarks and phase-skipping landmarks for the vehicle to travel to during the one or more phases; and
determining the set of landmarks associated with a given phase based at least in part on which landmarks that vehicles of the fleet of vehicles are arranged to leave from during a previous phase.

6. The method of claim 1, further comprising:
determining the single-phase landmarks for the one or more phases and the at least one respective landmark based on a minimum distance from each additional landmark of the plurality of landmarks that the vehicle starting from the respective landmark could reach during the phase; and
determining the phase-skipping landmarks for the landmark of the set of landmarks based on a minimum distance from each additional landmark of the plurality of landmarks that the vehicle starting from the landmark could reach by following a phase-skipping path.

7. The method of claim 6, further comprising determining which landmarks of the single-phase landmarks and phase-skipping landmarks for the vehicle to travel to during the one or more phases based on the minimum distances associated with the determined single-phase landmarks for the one or more phases and the at least one respective landmark.

8. The method of claim 1, further comprising:
determining the single-phase landmarks for the one or more phases and the at least one respective landmark based on confidence measures that are indicative of whether the vehicle starting from the respective landmark could reach each additional landmark of the plurality of landmarks during the phase; and
determining the phase-skipping landmarks for the landmark of the set of landmarks based on confidence measure that are indicative of whether the vehicle starting from the landmark could reach each additional landmark of the plurality of landmarks by following a phase-skipping path.

9. The method of claim 1, further comprising:
determining the single-phase landmarks for the one or more phases and the at least one respective landmark based on cost values associated with the vehicle traveling to each additional landmark of the plurality of landmarks during the phase; and
determining the phase-skipping landmarks for the landmark of the set of landmarks based on cost values associated with the vehicle traveling to each additional landmark of the plurality of landmarks by following a phase-skipping path.

10. The method of claim 1, further comprising determining which landmarks of the single-phase landmarks and phase-skipping landmarks for the vehicle to travel to during the one or more phases by minimizing a linear objective function.

11. A non-transitory computer-readable storage medium having stored therein instructions, that when executed by a computing device, cause the computing device to perform functions comprising:
receiving an initial location of one or more vehicles of a fleet of vehicles;
receiving a sequence of coverage requirements for a region and an associated period of time, wherein the region is divided into a plurality of landmarks and the period of time is divided into a plurality of phases, and wherein an individual coverage requirement is indicative of a desired number of vehicles of the fleet of vehicles for one or more of the plurality of landmarks at an end of a given phase;
determining, for each of one or more phases and at least one respective landmark of the plurality of landmarks, single-phase landmarks of the plurality of landmarks that can be reached by a vehicle of the fleet of vehicles starting from the respective landmark and following a single-phase path, wherein a single-phase path includes a path that the vehicle can travel for a duration of a single phase;

determining, for at least one respective phase of the one or more phases, phase-skipping landmarks of the plurality of landmarks that can be reached by the vehicle starting from a landmark of a set of landmarks associated with the respective phase and following a phase-skipping path, wherein a phase-skipping path includes a path that the vehicle can travel for a duration of two or more phases; and based on the sequence of coverage requirements and the initial locations of the one or more vehicles, determining, which landmarks of the single-phase landmarks and phase-skipping landmarks for the vehicle to travel to during the one or more phases.

12. The non-transitory computer-readable storage medium of claim 11, wherein the vehicle includes a balloon within a data network that is operable to provide data communication via optical or radio-frequency (RF) links.

13. The non-transitory computer-readable storage medium of claim 12:

wherein a single-phase path includes a path that the balloon can travel by following one or more estimated winds at one or more altitudes for a duration of a single phase; and wherein a phase-skipping path includes a path that the balloon can travel by following one or more estimated winds at one or altitudes for a duration of two or more phases.

14. The non-transitory computer-readable storage medium of claim 11, wherein the functions further comprise:

sequentially determining which landmarks of the single-phase landmarks and phase-skipping landmarks for the vehicle to travel to during the one or more phases; and determining the set of landmarks associated with a given phase based at least in part on which landmarks that vehicles of the fleet of vehicles are arranged to leave from during a previous phase.

15. The non-transitory computer-readable storage medium of claim 11, wherein the functions further comprise determining which landmarks of the single-phase landmarks and phase-skipping landmarks for the vehicle to travel to during the one or more phases by minimizing a linear objective function.

16. A system, comprising:

at least one processor; and data storage comprising program instructions executable by the at least one processor to cause the system to perform functions comprising:

receiving an initial location of one or more vehicles of a fleet of vehicles;

receiving a sequence of coverage requirements for a region and an associated period of time, wherein the region is divided into a plurality of landmarks and the period of time is divided into a plurality of phases, and wherein an individual coverage requirement is indicative of a desired number of vehicles of the fleet of vehicles for one or more of the plurality of landmarks at an end of a given phase;

determining, for each of one or more phases and at least one respective landmark of the plurality of landmarks, single-phase landmarks of the plurality of landmarks that can be reached by a vehicle starting from the respective landmark and following a single-phase path, wherein a single-phase path includes a path that the vehicle can travel for a duration of a single phase;

determining, for at least one respective phase of the one or more phases, phase-skipping landmarks of the plurality of landmarks that can be reached by the vehicle starting from a landmark of a set of landmarks associated with the respective phase and following a phase-skipping path, wherein a phase-skipping path includes a path that the vehicle can travel for a duration of two or more phases; and based on the sequence of coverage requirements and the initial locations of the one or more vehicles, determining, which landmarks of the single-phase landmarks and phase-skipping landmarks for a vehicle to travel to during the one or more phases.

17. The system of claim 16, wherein the functions further comprise instructing the vehicle to travel to the determined landmark during the one or more phases.

18. The system of claim 16, wherein the vehicle includes a balloon within a data network that is operable to provide data communication via optical or radio-frequency (RF) links.

19. The system of claim 16, wherein the functions further comprise:

sequentially determining which landmarks of the single-phase landmarks and phase-skipping landmarks for the vehicle to travel to during the one or more phases; and determining the set of landmarks associated with a given phase based at least in part on which landmarks that vehicles of the fleet of vehicles are arranged to leave from during a previous phase.

20. The system of claim 16, wherein the functions further comprise determining which landmarks of the single-phase landmarks and phase-skipping landmarks for the vehicle to travel to during the one or more phases by minimizing a linear objective function.

* * * * *